UNITED STATES PATENT OFFICE.

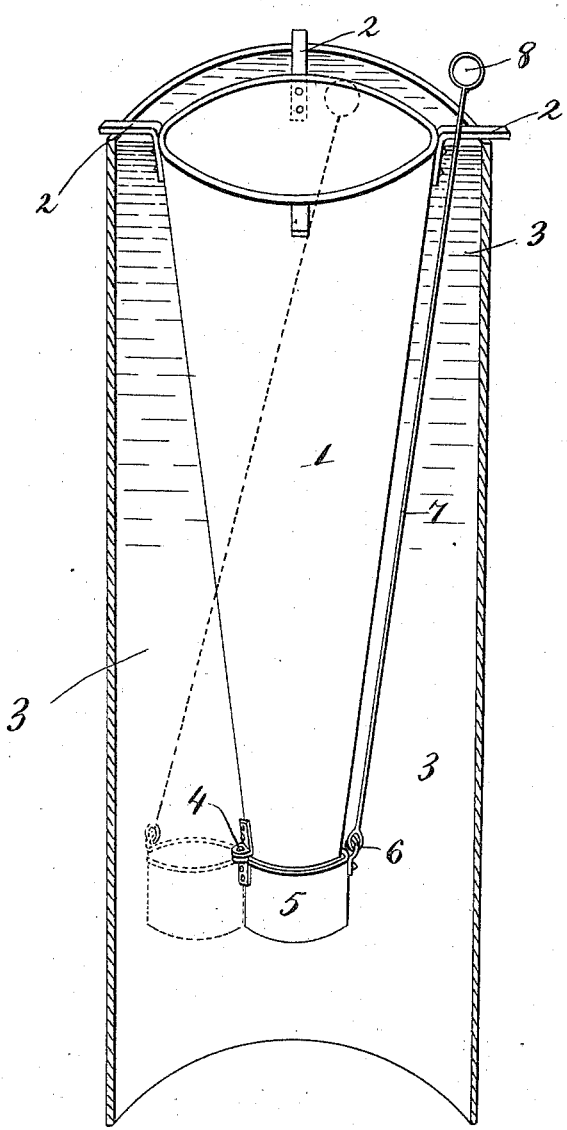

EDWARD P. McDONALD, OF ASHAWAY, RHODE ISLAND.

ORE-SEPARATOR.

SPECIFICATION forming part of Letters Patent No. 577,874, dated March 2, 1897.

Application filed August 15, 1896. Serial No. 602,892. (No model.)

*To all whom it may concern:*

Be it known that I, EDWARD P. McDONALD, a citizen of the United States, and a resident of Ashaway, county of Washington, and State of Rhode Island, have invented certain new and useful Improvements in Ore-Separators, of which the following is a specification, reference being had to the accompanying drawing, forming a part thereof, in which similar figures of reference indicate corresponding parts.

My invention has relation to ore-separators.

My object is to provide a separator which will be thorough in operation, cheap to manufacture, simple in construction, and durable in use.

Heretofore ore-separators have been cumbersome and complicated in construction, thereby making them expensive, while, owing to their intricate mechanical construction, they were extremely liable to get out of order. By means of the ore-separator which I have devised all these objectionable features have been overcome, while the effectiveness of the separator has still been retained.

In the drawing, which is an elevation of my invention, partially in section, my separator 1 is shown attached by means of fingers 2 to the tank 3. In general contour the pipe or body portion of my separator is conical, the fingers 2 being suitably secured thereto by means of rivets or in any desired manner. Attached to the reduced end of the body portion by means of a pivot 4 is a trap 5, of the usual and well-known construction, while jointedly connected, as at 6, to the trap 5 is a rod 7, terminating in a finger-hold 8. It will be readily seen that by simply moving the rod 7 the distance between the two fingers 2 the trap 5 will be swung out of alinement with the remaining portion of the separator 3, as clearly shown in dotted lines.

In operation the separator, as is usual, is filled with water. The crushed material is fed into it by any suitable means, (not shown,) when the weight of the ore in the material fed into the separator, being heavier than the other material present, will cause it to sink rapidly into the trap 5. When the operator desires to remove the ore from the tank, he gives the rod 7 a sudden turn, throwing the tank 5 in the position indicated in dotted lines. By this movement the remaining debris in the separator is allowed to pass out, while the ore may then be removed from the tank. A reverse movement of the rod returns the tank and the separator is again ready for use.

From the above description the simplicity of construction and operation of my device will be apparent.

Having thus described my invention, what I claim as new, and desire to secure by Letters Patent, is—

1. An ore-separator, comprising a tank inclosing a body portion having a trap pivoted at its lower end, a loosely-connected operating-rod secured at one end to said trap and terminating in a finger-hold, said rod being adapted to swing said trap horizontally, and fingers secured to the upper portion of said body portion for attaching it to the tank, substantially as shown and described.

2. An ore-separator, comprising a tank adapted to be filled with water, inclosing a conical-shaped body portion, a trap pivoted to the reduced end of the body portion and adapted to swing in a horizontal plane, an operating-rod attached to said trap and terminating in a finger-hold and fingers at the enlarged end of the body portion for securing it to the tank, substantially as shown and described.

3. An ore-separator, comprising a tank in which is located a body portion having a pivoted trap secured thereto at the lower end, said trap being adapted to be swung in a horizontal plane so as to retain its contents, means for operating the trap comprising a rod, and fingers for securing the body portion to the tank, substantially as shown and described.

In testimony that I claim the foregoing as my invention I have signed my name, in presence of two witnesses, this 6th day of August, 1896.

EDWARD P. McDONALD.

Witnesses:
FRANK C. BERRY,
OLIVER LANGWORTHY.